United States Patent [19]

Albright

[11] 4,284,368
[45] Aug. 18, 1981

[54] VEHICLE WITH DUAL DRILL BOOMS AND TEMPORARY ROOF SUPPORT

[75] Inventor: Charles D. Albright, Fairmont, W. Va.

[73] Assignee: FMC Corporation, San Jose, Calif.

[21] Appl. No.: 4,429

[22] Filed: Jan. 18, 1979

[51] Int. Cl.³ .......................................... E21D 20/00
[52] U.S. Cl. .................................... 405/291; 173/38; 248/354 H; 248/654; 299/35
[58] Field of Search ...................... 173/38; 299/31, 33; 248/354 H, 654; 405/297, 295, 291

[56] References Cited

U.S. PATENT DOCUMENTS

| | | | |
|---|---|---|---|
| 3,481,410 | 12/1969 | Lewkowicz | 248/654 |
| 3,768,579 | 10/1973 | Long | 173/38 |
| 3,823,902 | 7/1974 | Bumveller | 248/654 |
| 3,842,610 | 10/1974 | Willis et al. | 173/38 |
| 3,871,707 | 3/1975 | Jamison | 299/33 |
| 4,117,894 | 10/1978 | Saunders | 173/38 |

FOREIGN PATENT DOCUMENTS 509718  6/1976  U.S.S.R. ..................... 299/33

Primary Examiner—William F. Pate, III
Attorney, Agent, or Firm—A. J. Moore; R. B. Megley

[57] ABSTRACT

A mining vehicle has a body with a center boom extending forwardly from the body. A temporary roof support is mounted on the outer end of the center boom. The roof support has a base, a telescopic column, and a cross beam on top of the column with auxiliary beams pivotally connected to the cross beam to engage the roof. Hydraulic jacks are connected between the base and the outer ends of the beams, respectively. A pedestal is pivotally mounted on the front end of the body, on each side of the center boom, to support a drill boom. A drill head is pivotally mounted at the outer end of the drill boom and is vertically movable by the drill boom for roof drilling. Each drill boom has the end opposite the drill head received in a track on the pedestal which serves to maintain the drill head on a vertical axis in any position of the drill boom. Each pedestal, at its inner end, has a laterally extending arm, the outer end of which is pivotally connected to the body at a pivot joint. A swing jack is connected between the body and the arm to swing the pedestal and drill boom about the pivot joint.

7 Claims, 10 Drawing Figures

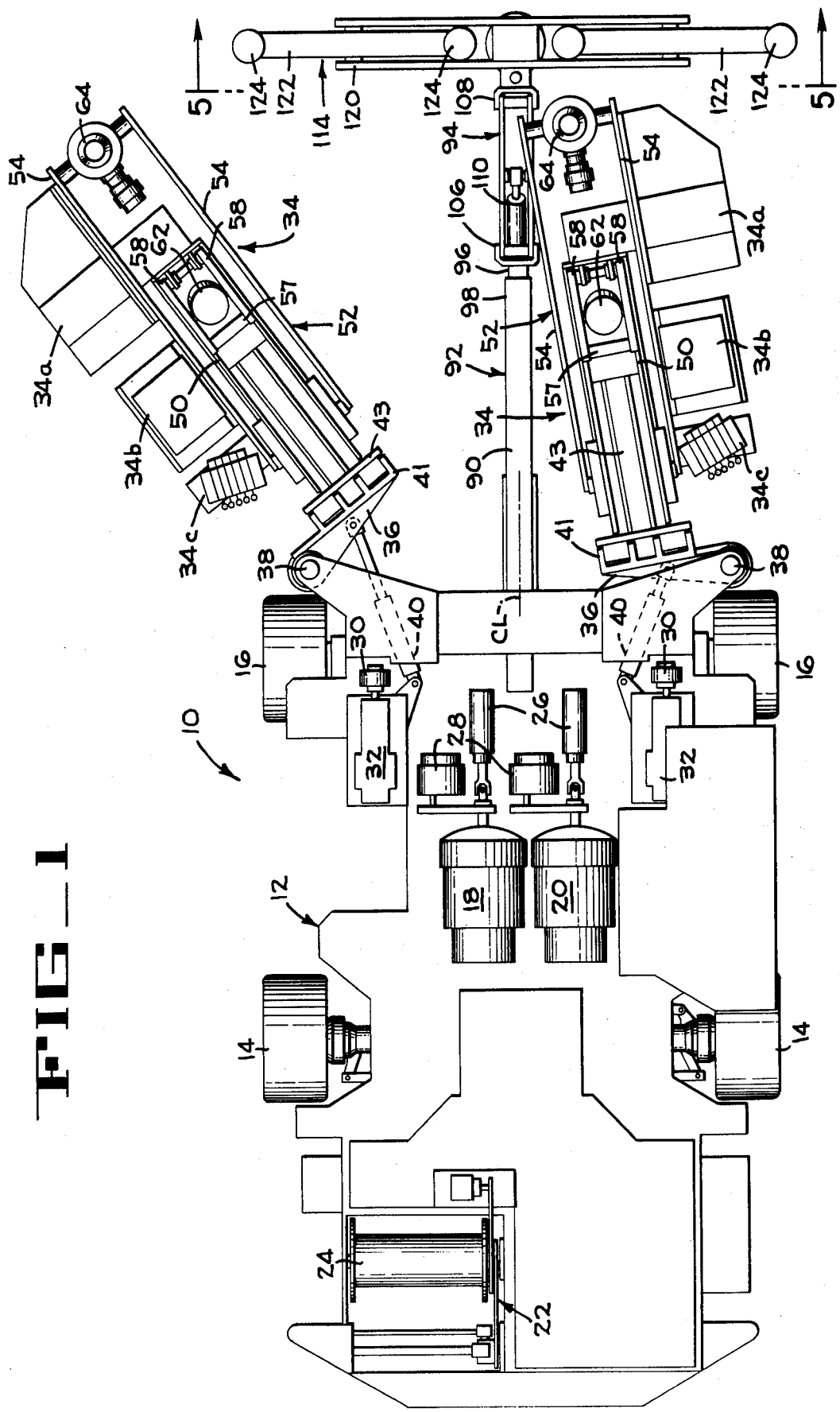
FIG_1

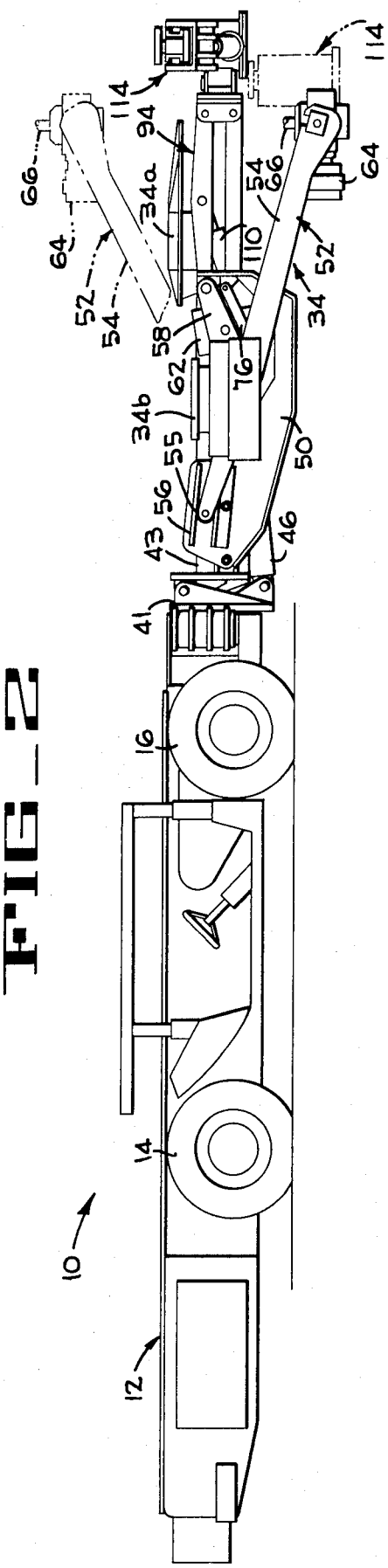
FIG_2
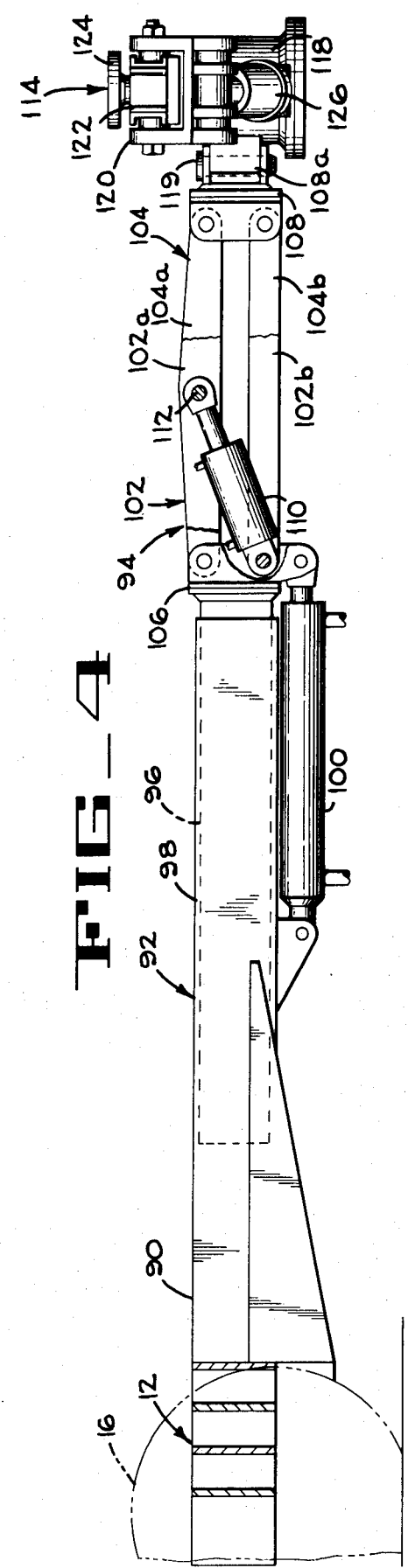
FIG_4

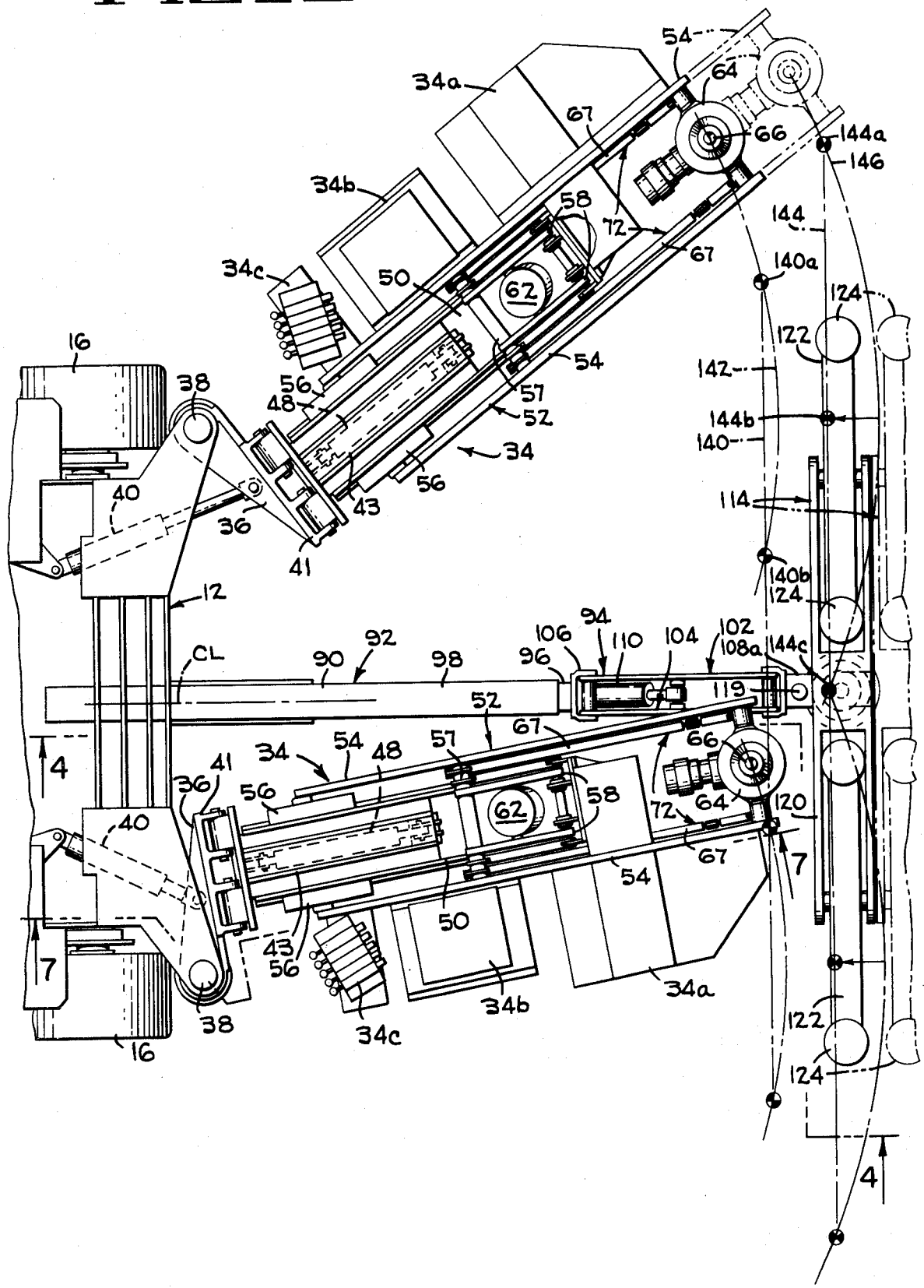

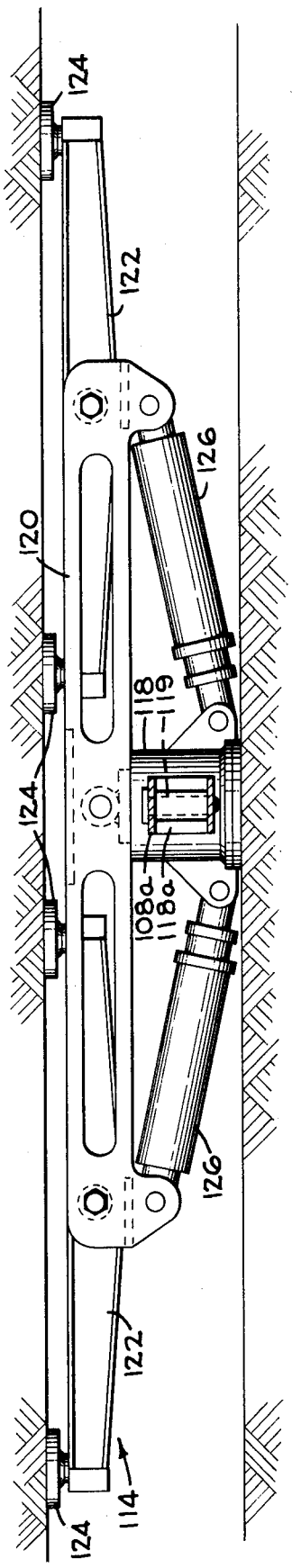
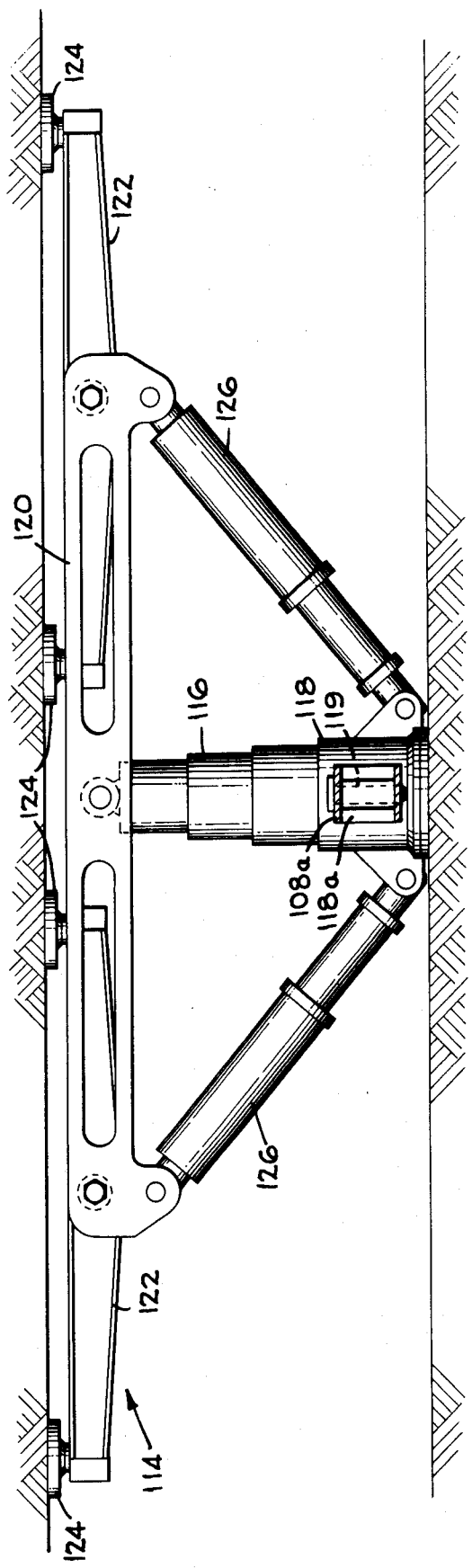

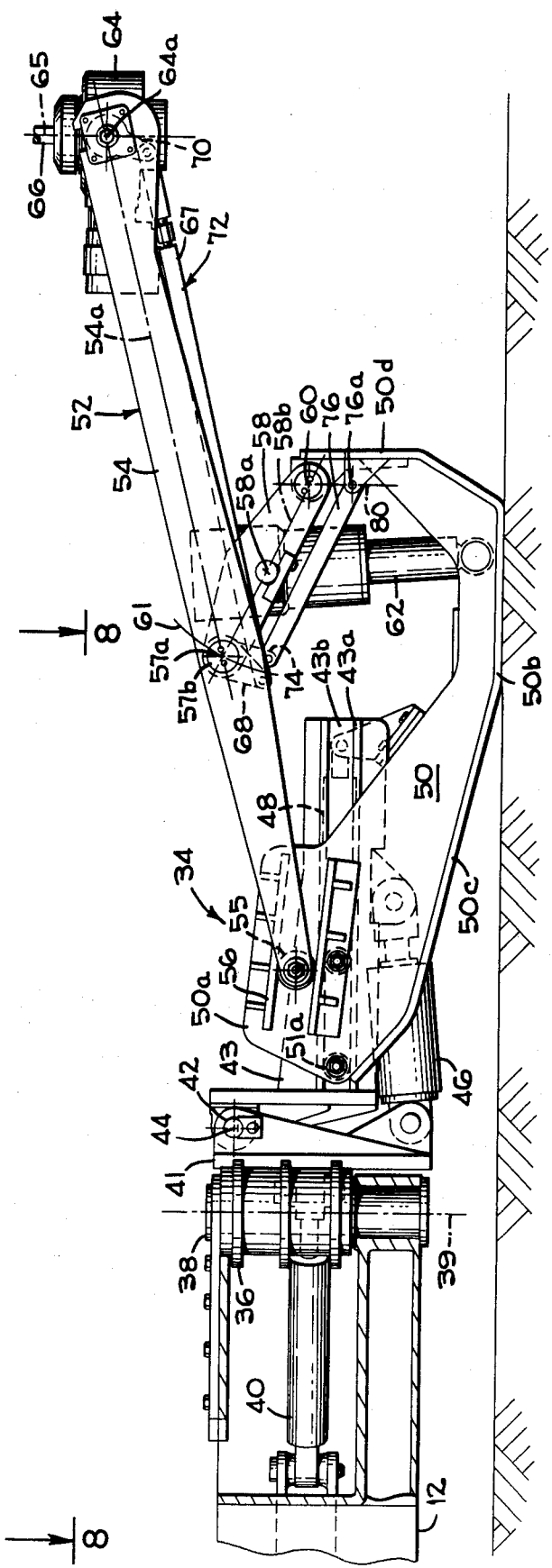

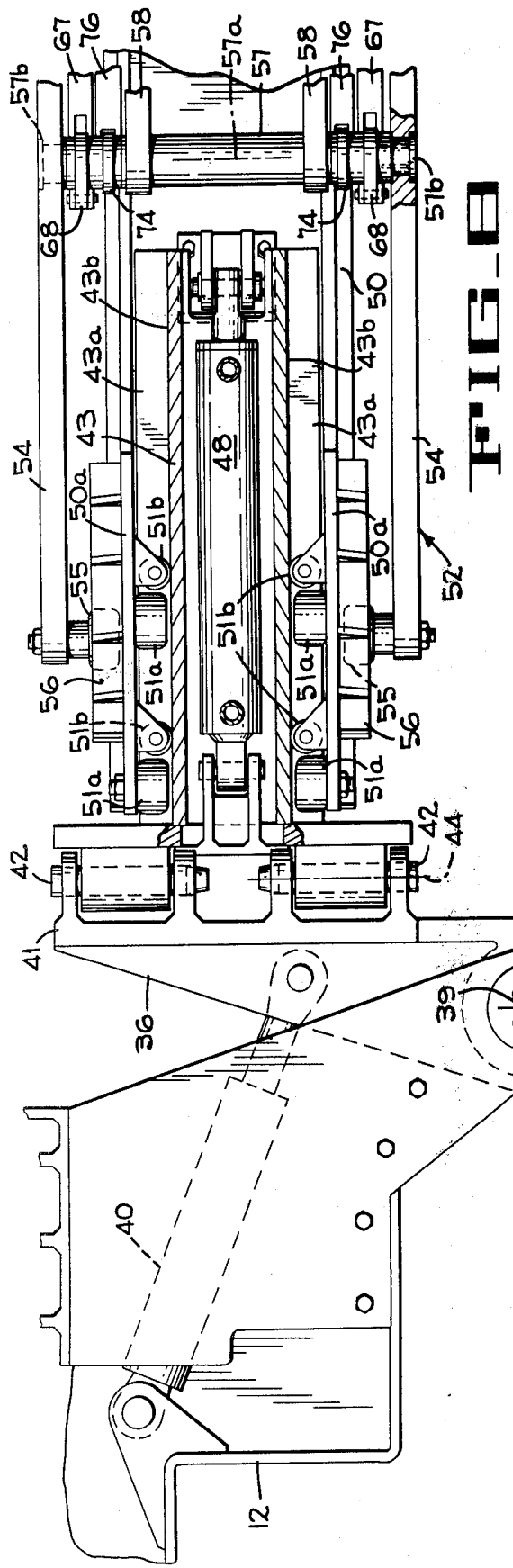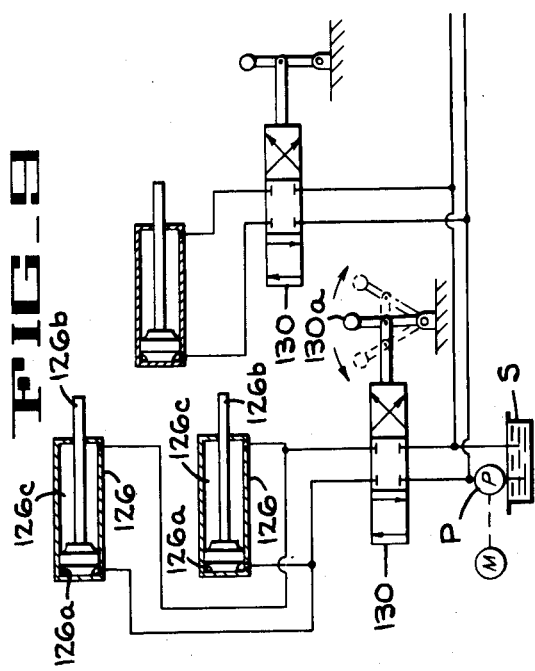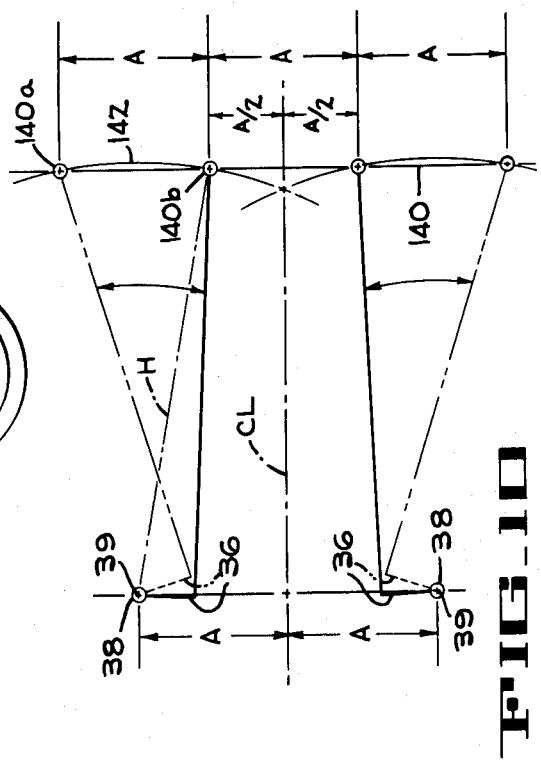

VEHICLE WITH DUAL DRILL BOOMS AND TEMPORARY ROOF SUPPORT

BACKGROUND OF THE INVENTION

1. Field of the Invention

The present invention relates to an underground mining vehicle, and, more specifically, a vehicle having dual drill booms and a temporary roof support.

2. Description of the Prior Art

It is known to mount drill booms on the body of an underground mining vehicle, as shown, for example, in U.S. Pat. No. 3,995,905. Sometimes the drill boom is mounted on a pedestal which is connected to, or forms a part of, the vehicle body. It is also common to provide a swing jack to swing a drill boom, and the drill head thereon, into a desired position to drill a hole for a roof supporting bolt. One end of the swing jack is generally connected to the vehicle body and the other end connected to the side of the jack.

Frequently, underground mining vehicles are provided with temporary roof supports to brace the roof adjacent a hole, while the hole is being drilled, and until a roof support bolt is received therein. One type of roof support, shown in U.S. Pat. No. 3,830,456, has a telescopic column and a cross beam. A hydraulic jack is received inside the telescopic column to raise the beam for support of the roof and to lower the beam after the roof is bolted.

SUMMARY OF THE INVENTION

In the present invention, a novel space-saving arrangement of the swing jack is provided. The improvement comprises an arm on the inner end of the drill boom, said arm extending laterally from said boom for connection at a pivot joint on the vehicle body, and a swing jack connected between the body and the inner end of the drill boom to swing the drill boom about the pivot joint.

With the arrangement of the present invention, the jack can be located in alignment with, and behind, the drill boom to avoid interference with apparatus on either side of the drill boom. Moreover, the drill boom can be used to drill holes in a straight, laterally extending line, without extension, from a position farther inboard than otherwise possible. Thus, with dual, side-by-side drill booms on a vehicle, the booms can conveniently be spaced closer together, and the vehicle can be made narrower, than would otherwise be possible.

Another feature of the present invention relates to a stable temporary roof support. The roof support has a base, a telescopic column mounted on the base, and a cross beam connected to the column. The improvement comprises an expandable member (such as a jack) on each side of the column having one end connected to the base and the other end connected to the beam at a point spaced from the column, and means to expand said members and raise the beam toward the roof.

With this construction, firm lateral support is provided for the roof support column.

It is therefore one object of the present invention to provide an improved swing jack arrangement for a drill boom wherein the jack will not interfere with apparatus on either side of the drill boom.

It is another object of the present invention to provide an improved boom configuration for a dual drill boom mine vehicle wherein the drill booms have good lateral reach from inboard positions without extension.

It is yet another object of the present invention to provide an improved roof support wherein firm lateral support is provided for the roof support column.

BRIEF DESCRIPTION OF THE DRAWINGS

FIG. 1 is a plan view of a mine vehicle constructed in accordance with the present invention.

FIG. 2 is a side elevation of the machine of FIG. 1.

FIG. 3 is a fragmentary plan view of the machine of FIG. 1, showing different patterns of bolt holes.

FIG. 4 is a longitudinal section taken on the line 4—4 of FIG. 3.

FIG. 5 is a transverse section taken on the line 5—5 of FIG. 1, showing the temporary roof support engaging a low roof.

FIG. 6 is a view taken as the view of FIG. 5, showing the roof support engaging a higher roof.

FIG. 7 is a longitudinal section taken on the line 7—7 of FIG. 3.

FIG. 8 is a fragmentary plan view taken in the direction of arrows 8—8 of FIG. 7 with portions broken away.

FIG. 9 is a fragmentary schematic diagram of a hydraulic control system.

FIG. 10 is a schematic diagram of the dual drill booms.

DESCRIPTION OF THE PREFERRED EMBODIMENT

The mining vehicle 10 has a body 12 with steerable wheels 14 and drive wheels 16, as shown in FIG. 1. Two electric motors 18 and 20 are mounted on the body, and receive power through an electrical cable (not shown) which is wound by a spooling device 22 upon a cable reel 24. Each motor drives a hydraulic pump 26 and a blower 28. Each drive wheel 16 is driven by a hydraulic motor 30 through a speed reducer 32.

As shown in FIGS. 1, 3, 7 and 8, a drill boom unit 34 is pivotally mounted on each side of the machine. A drill canopy 34a, a dust box 34b and a control panel 34c are mounted on the outer side of each drill unit. For each drill boom unit 34, there is provided a swing arm 36 which is pivotally connected at one end to the body at a swivel joint 38 having a substantially vertical axis 39. A swing jack 40, connected between the body and the swing arm, swings the arm in a substantially horizontal plane about the axis 39. At the other end, the swing arm has a bracket 41 which is pivotally connected by pins 42 to a tilt arm 43 on axis 44, as shown in FIG. 7. A tilt jack 46, connected between the swing arm bracket 41 and the tilt arm 43, can swing the tilt arm about horizontal axis 44.

A sump jack 48 is secured at one end in each of the tilt arms 43. The opposite end of the sump jack is connected to a pedestal 50 which is a part of drill boom unit 34. The pedestal 50 can be moved forwardly and rearwardly by the sump jack, and has rollers 51a and 52b mounted thereon which ride is tracks 43a and 43b on the tilt arm 43 to guide the movement of the pedestal relative to the tilt arm. Thus, each pedestal 50 can be swung horizontally in and out by the swing jack 40, tilted up and down by the tilt jack 46, and moved forwardly and rearwardly by the sump jack 48.

Each pedestal 50 has a rear portion 50a, a flat base portion 50b, a downwardly and forwardly sloping portion 50c between the rear portion and the base portion, and a forward, upstanding portion 50d.

Each drill boom unit 34 has, in addition to the pedestal 50, a drill boom 52 with spaced apart side plates 54, as shown best in FIGS. 3 and 8. Rollers 55, mounted on one end of the side plates, ride in tracks 56 on the rear portion 50a of the pedestal. A shaft 57, extending between the side plates in the central portion of the boom on an axis 57a, has end portions pivotally received in the side plates. An end plate 57b, secured to the end faces of shaft 57 and extending beyond the outer surface of the shaft 57, retains the side plates 54 in assembled relation with shaft 57. The shaft 57 pivotally receives, on horizontal axis 57a, one end of a pair of spaced apart lever arms 58, the opposite ends of which are pivotally connected to the forward portion 50d of the pedestal on a horizontal axis 60. A boom lift jack 62 has one end pivotally connected to the base portion 50b of the pedestal and the opposite end pivotally connected to the centers of the lever arms 58 (on axis 58a), to extend in a generally vertical orientation between the lever arms. Thus, when the boom lift jack is extended or retracted, the lever arm pivots about axis 60, raising or lowering the boom. At the same time, the boom moves forwardly and rearwardly, by virtue of the circular path 61 described by the ends of lever arms 58 opposite axis 60, moving the rear end of the boom forward and back in tracks 56.

A drill head 64 having a vertical drill axis 65 on which a drill 66 extends, is pivotally mounted, on horizontal axis 64a, between the side plates 54 of the drill boom at the forward end thereof. Rods 67 extend in parallel relation to an axis 54a extending between, and intersecting, axes 57a and 64a. Rods 67, which are parallel to each other, are each connected by links 68, 70 to the shaft 57 and the drill unit 64, respectively, to form a parallel mechanism 72 on each side of the drill head 64, each parallel mechanism consisting of side plate 54, link 68, rod 67 and link 70. Regardless of the position of the drill boom, the link 68 must remain parallel to link 70, and, since link 70 is connected to the drill head in a fixed angular relation, the angle of the drill head will be determined by the angle of link 68.

Link 68 on shaft 57 is fixed thereon at a predetermined angular relation to a second link 74 which is also fixed on shaft 57. This second link 74 is therefore also at a predetermined angle to the link 70, and the drill head 64. A rod 76 is connected between link 74 and the forward portion 50d of the pedestal, and is pivotally connected to the pedestal on axis 76a, which is in a vertical plane 80 passing through axis 60. The rod 76 is in parallel relation to an axis 58b extending between, and intersecting, axis 60 and the central axis 57a of shaft 57. Thus a second parallel mechanism 78 is formed by lever arm 58, link 74, rod 76 and the pedestal portion 50d. Since the lever arm 58 and the rod 76 are connected to the pedestal in a vertical plane 80, the link 74 must always remain vertical, regardless of the orientation of the lever arm 58 and rod 76. The angle between the central drill axis 65 of the drill head, and the link 70 connected to the drill head, is the same as the angle between the link 68 on shaft 57 and the link 74 on that shaft. Since the links 68 and 70 must always be parallel, because they are parts of a parallel mechanism 72, and since the link 74 is always vertical, the central drill axis 65 of the drill head must remain always vertical regardless of the angular position of the boom.

As shown best in FIGS. 1, 3 and 4, a horizontal boom 90 is mounted on the vehicle body 12 and extends in a forwardly direction. The boom 90, which can be referred to as a center boom, has a telescopic portion 92 and a tilt portion 94. The telescopic portion of the boom has an inner section 96 and an outer section 98 which are connected, respectively, to opposite ends of a center beam extension jack 100. The jack 100 serves to extend and retract the inner section 96 with respect to the outer section 98. The tilt portion of the boom consists of two laterally spaced sets of sidebars 102, 104. Each set 102, 104 has an upper bar (102a, 104a, respectively) and a lower bar (102b, 104b, respectively). The sidebars are pivotally connected at one end to a rear end member 106 (which is mounted on the forward end of the inner boom section 96) and are pivotally connected at the other end to a forward end member 108. A tilt portion jack 110 has one end connected to the rear end member 106 and has the other end pivotally connected to a pin 112 extending between the upper sidebars 102a and 104a. The upper sidebars (102a, 104a, respectively), the lower sidebars (102b, 104b, respectively), the rear end member 106 and the forward end member 108, define a parallel mechanism so that when the jack 110 is extended, the tilt portion of the boom is elevated but the end members remain parallel in vertical orientations.

A temporary roof support 114 is removably mounted to end member 108 at the forward end of the center boom tilt portion 94. As shown best in FIGS. 5 and 6, the temporary roof support 114 has a telescopic column 116 with a base portion 118. A tongue 108a extending from end member 108 is connected by removable pin 119 to a socket 118a on the base section 118. The column 116, when extended, is vertical in any position of the tilt portion 94 of the boom 90 by virtue of the parallel mechanism defined by the members of the tilt portion. The upper portion of the telescopic column is pivotally connected to a crossbeam 120. Auxiliary crossbeams 122 are pivotally connected at each end of the crossbeam 120. Pads 124 are mounted on each end of the auxiliary crossbeams for engagement with the roof when the telescopic boom is raised. A roof support jack 126 is connected between the base portion 118 of the telescopic boom and each end of the crossbeam.

Each jack in the mining machine 10 described herein is operated singly by a control valve 130, except the two jacks 126 which are operated in unison by a single valve 130 as shown in FIG. 9. The valve 130 will send fluid under pressure from pump P to advance chambers 126a in jacks 126 when the valve handle 130a is shifted to the right to extend the piston rod 126b, and will return exhaust fluid from retract chamber 126c to the sump S. The valve 130 will send fluid under pressure from pump P to retract chambers 126c in jacks 126 when the valve handle 130a is shifted to the left to retract piston rod 126b, and will return exhaust fluid from advance chamber 126a to the sump S.

In operation of the apparatus of the present invention, the vehicle is advanced in the mine to a position, as shown in FIG. 3, for drilling bolt holes in the roof of the mine. It is customary to position the holes along a laterally extending line 140. If four holes are required, two on each side of the centerline CL of the machine, the drill boom unit 34 is swung by jack 40 to a position where the drill head axis 65 will intersect the line 140 at a first hole position 140a upon suitable positioning by operation of the sump jack 48.

Before drilling is begun, the temporary roof support 114 is advanced, by operation of jack 100, to a position close to, but forward of, the drill hole line 140. Thereafter, the jacks 126 are operated to raise the crossbeam 122 until the pads 124 firmly engage the roof.

After the temporary roof support is in position, the first hole is drilled at position 140a. The boom is then swung to move the head along the arcuate path 142 to the second hole position 140b, where the second hole is drilled. The same procedure is followed with the other drill boom.

If an additional hole is required in a drill hole pattern, such as on transverse line 144, the drill head is positioned as shown in dotted lines in FIG. 3 (on arc 146) to drill the first and third holes 144a and 144c. The drill head is retracted by sump jack 48 to drill the second hole 144b.

From FIG. 3, it will be noted that a pattern of six holes can be drilled on line 140, if an additional hole on each side of the centerline of the machine is drilled (outboard of holes 140a) after extension of the sump jack 48 to position the drill head on line 140.

In a preferred arrangement of the drill boom units, as shown in FIG. 10, each pivot joint 38 is spaced from the centerline, a distance A equal to a preferred distance A between adjacent holes. The drill boom, however, by virtue of the laterally extending arm 36 (which extends inwardly from the pivot joint) lies, in a stored position, closer to the centerline CL than the pivot joint 38. Thus, as shown in FIG. 1, the drill boom, when stored, lies in a position where no part thereof extends beyond the wheels of the vehicles.

The relationship between the spacing of the pivot joints to the centerline of the machine, and the span between holes, is given by way of illustration only. In any event, however, the positioning of the drill boom inboard of the pivot joint increases the compactness of the machine when the drill boom units are in the stored position.

It will also be noted from FIG. 10, that the L-shaped drill boom unit provides a reach equal to the hypotenuse H of the right-angled L shaped drill boom unit. In other words, the arms 36 not only position the drill booms farther inboard, but they also increase the reach of those booms from the pivot axis.

Although the best mode contemplated for carrying out the present invention has been herein shown and described, it will be apparent that modification and variation may be made without departing from what is regarded to be the subject matter of the invention.

What is claimed is:

1. In a support for a mine roof having a base, a telescopic column mounted on the base, and a crossbeam connected to the column, the improvement comprising an expandable member on each side of the column having one end connected to the base and the other end connected to the beam at a point spaced from the column, and means to expand said members and raise the beam toward the roof.

2. A support according to claim 1 including auxiliary beams pivotally mounted on the crossbeam for engagement with the roof.

3. In a temporary support for a mine roof comprising a base, a telescopic column mounted on the base, and a crossbeam connected to the top of the column and extending laterally on each side thereof, the improvement comprising two expandable hydraulic jacks each having a cylinder and piston, one of said jacks mounted on each side of the column, one end of each of said jacks connected to the base and the other end of each of said jacks connected to the crossbeam at a point spaced from said column, means to expand and retract said hydraulic jacks, and a plurality of auxiliary beams pivotally mounted on the crossbeam for engagement with the roof.

4. In a mining machine having means for longitudinal movement in a mine, a boom extending longitudinally from the mining machine, a temporary roof support mounted on the end of said boom, said roof support having a base and having a telescopic column mounted on the base, said roof support having a laterally extending beam with a center point connected to the top of the column to extend equally on each side thereof, the improvement comprising an expandable hydraulic jack on each side of the column, said jacks each having a cylinder and piston, one end of each of said jacks connected to the base and the other end of each of said jacks connected to the end of the crossbeam, means to expand and retract said hydraulic jacks, and at least one auxiliary beam pivotally connected to said beam on each side of the column for engagement with and support of the roof.

5. A machine having a body and having a drill boom mounted on the body to extend generally longitudinally thereof and having a drill unit at the outer end, the mounting means including means defining a pivot joint on the body for said drill boom to permit lateral movement of the boom, the improvement comprising an arm on the inner end of the drill boom, said arm extending laterally from said boom for connection at said pivot joint, and a swing jack connected between the body and the inner end of the drill boom to swing the drill boom about the pivot joint in a direction laterally of the boom.

6. A mining machine having a body with a longitudinal centerline and having a drill boom mounted on the body on each side of the centerline, each of said drill booms having a drill unit at the outer end thereof, and means defining a pivot joint on the body spaced laterally from the body centerline for each of said drill booms, the improvement comprising an arm on each of said drill booms at the inner end thereof, said arms extending laterally from said booms for connection at said pivot joints, and a swing jack connected between the body and the inner end of each of the drill booms to swing the drill booms laterally of the centerline about said pivot joints.

7. A mining machine having a body with a longitudinal centerline and having a drill boom mounted on the body on each side of the centerline, each of said drill booms having a drill unit at the outer end thereof, the boom mounting including means defining a pivot joint on the body for each of said drill booms, the improvement comprising a bracket arm on each of said drill booms at the inner end thereof, said arms extending laterally outwardly from said booms, means pivotally connecting the outer ends of said arms to said pivot joints, respectively, and a swing jack for each boom having one end pivotally connected to the body and having the opposite end pivotally connected to the arm at a point in alignment with the boom for swinging the boom laterally toward and away from the centerline of the body.

* * * * *